Figure 1:
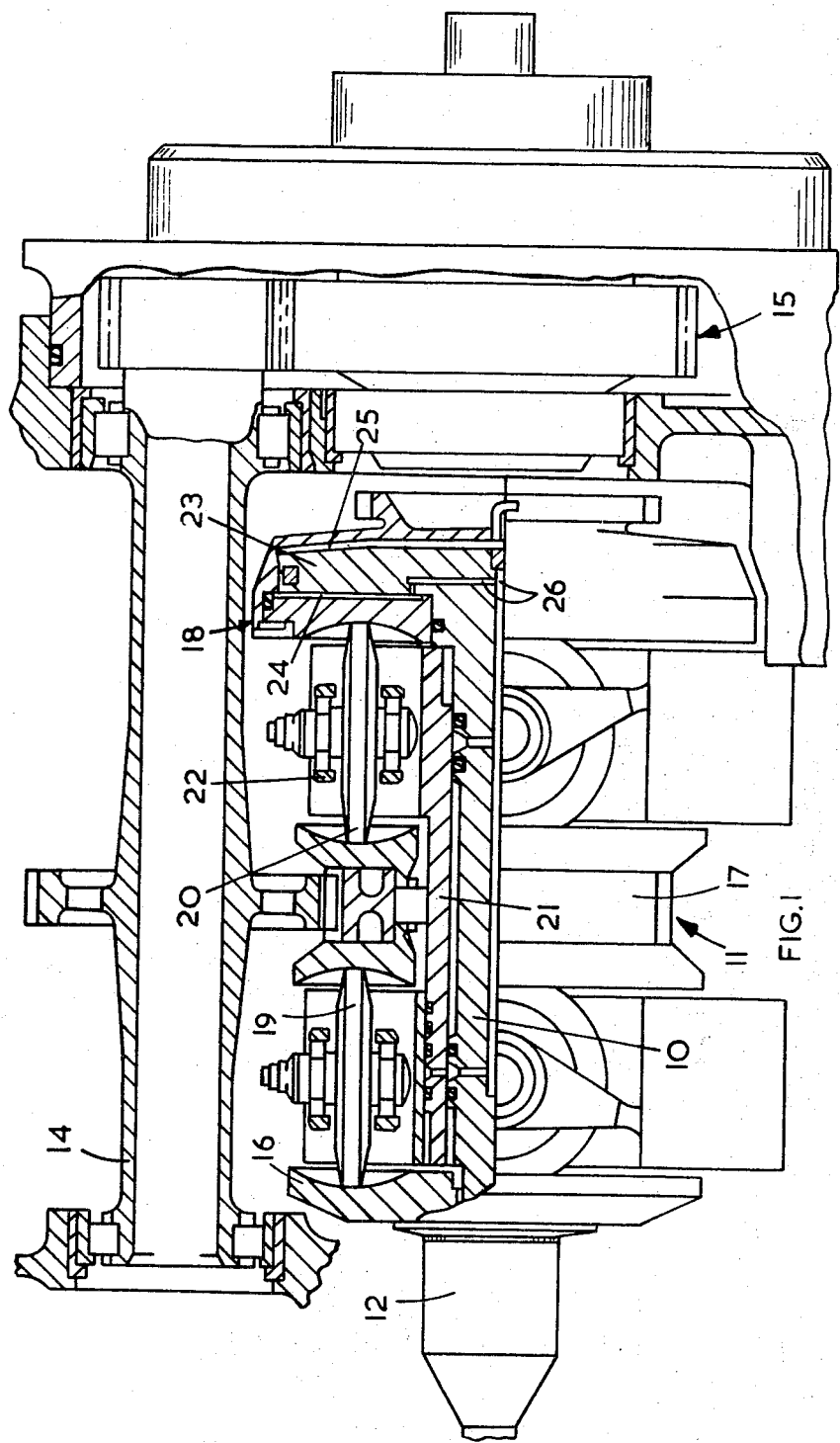

United States Patent [19]
Sharpe et al.

[11] 3,826,147
[45] July 30, 1974

[54] CONSTANT SPEED HYDRAULICALLY CONTROLLED TORIC TRANSMISSION WITH CONCENTRIC TWO PISTON VALVE AND GOVERNOR MEANS

[75] Inventors: Raymond Sharpe, Mirfield; James Christopher Herbert Triffit, Baildon, both of England

[73] Assignee: Rotax Limited, Birmingham, England

[22] Filed: July 27, 1972

[21] Appl. No.: 275,871

[30] Foreign Application Priority Data
July 27, 1971 Great Britain.................... 35322/71

[52] U.S. Cl................................................. 74/200
[51] Int. Cl............................................. F16h 15/38
[58] Field of Search...................... 74/200, 190, 208

[56] References Cited
UNITED STATES PATENTS
| | | | |
|---|---|---|---|
| 3,142,190 | 7/1964 | Kelsey et al. | 74/200 |
| 3,276,279 | 10/1966 | Perry et al. | 74/200 |
| 3,413,864 | 12/1968 | Magill et al. | 74/200 |

Primary Examiner—Samuel Scott
Assistant Examiner—Allan Russell Burke
Attorney, Agent, or Firm—Holman & Stern

[57] ABSTRACT

A variable-ratio frictional drive gear comprises two axially spaced torus discs between which there is a set of circumferentially spaced drive rollers in frictional rolling contact with toroidal surfaces on the discs. Each roller is rotatably mounted in a roller carriage which can tilt about an axis at right angles to the axis of rotation of the roller so as to vary the distances from the gear axis at which the roller engages respectively the two discs, thus varying the drive ratio of the gear. The variable ratio frictional drive gear further includes a first piston which is slidable in a second hollow piston under the influence of hydraulic fluid wherein axial movement of the first piston is arranged to effect tilting movement of the roller carriage. Means are also provided to reduce the pressure, which is, in use, applied to the first piston by the hydraulic fluid, such reduction occurring when the first piston reaches a predetermined axial position relative to the second piston. The latter is slidable in a cylinder under the influence of control fluid supplied by a governor, the control fluid being independent of the hydraulic fluid which influences the slidable movement of the first piston in the second piston.

5 Claims, 2 Drawing Figures

CONSTANT SPEED HYDRAULICALLY CONTROLLED TORIC TRANSMISSION WITH CONCENTRIC TWO PISTON VALVE AND GOVERNOR MEANS

This invention relates to variable-ratio frictional drive gears of the kind comprising two axially spaced torus discs between which there is a set of circumferentially spaced drive rollers in frictional rolling contact with toroidal surfaces on the discs, each roller being rotatably mounted in a roller carriage which can tilt about an axis at right angles to the axis of rotation of the roller so as to vary the distances from the gear axis at which the roller engages respectively the two discs, thus varying the drive ratio of the gear. The angle of tilt of the roller carriages, as it controls the drive ratio of the gear, will hereinafter be referred to as the "ratio angle." Such a frictional drive gear is shown and described in U.S. Pat. specification No. 3,413,864.

It is an object of the present invention to provide a variable-ratio frictional drive gear in a convenient form.

In accordance with the present invention there is provided a variable-ratio frictional drive gear of the kind specified said variable-ratio frictional drive gear including a first piston which is slidable in a second hollow piston under the influence of hydraulic fluid wherein axial movement of said first piston is arranged to effect tilting movement of said roller carriages, and means to reduce the pressure which is, in use, applied to said first piston by said hydraulic fluid such reduction occurring when the first piston reaches a predetermined axial position relative to said second piston, the latter being slidable in a cylinder under the influence of control fluid supplied by a governor, said control fluid being independent of the aforesaid hydraulic fluid which influences the slidable movement of said first piston in said second piston.

Preferably, said second piston is in the form of a sleeve and the second piston is desirably provided at its inner end with a radially outwardly extending flange which slidably engages the wall of the cylinder and conveniently the latter may be formed in a housing. In this case, a pair of chambers are defined between opposed ends of said flange and the housing wherein the chamber partly defined by the innermost axial end of the flange is in use supplied with said control fluid from the governor whereas the other chamber is in use supplied with hydraulic fluid and/or is provided with resilient means to urge the second piston against the force exerted by said control fluid.

Figure 2:
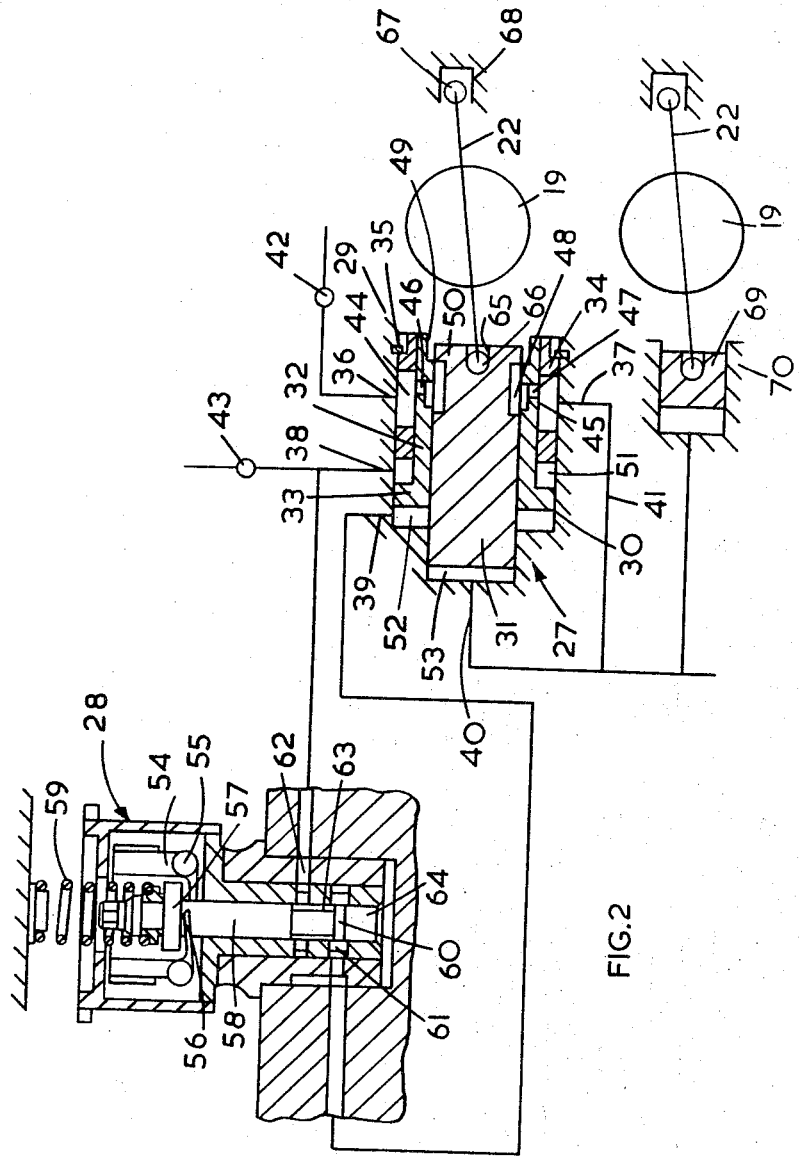

The invention will now be more particularly described with reference to the accompanying drawings wherein:

FIG. 1 is a sectional view of part of one embodiment of a variable-ratio frictional drive gear according to the present invention, and FIG. 2 is a view partly in section, of a further part of the embodiment illustrated in FIG. 1 but on a much larger scale than FIG. 1.

Referring to FIG. 1 of the drawings, there is shown therein a variable-ratio frictional drive gear 11 having an output shaft 10 which drives a load shaft 12. The input of the gear 11 is transmitted through a lay shaft 14 from a gear train which is indicated by the reference numeral 15.

The gear 11 consists of three torus discs 16, 17 and 18 between which two sets of rollers 19 and 20 are in frictional rolling engagement, the central disc 17 being double sided. This central torus disc 17 is rotationally connected to the lay shaft 14 (with freedom to move slightly axially) and is mounted on bearings within a sleeve member 21. The outer disc 16 is secured to the output shaft 10 for rotation therewith and so as to be axially fixed with respect to the shaft 10, whilst the other outer disc 18 is connected to the output shaft for rotational movement therewith and axial movement relative thereto. The drive ratio of the gear 11 is varied by altering the ratio angle of the rollers. As shown in FIG. 1, the rollers 19, 20 are shown at a ratio angle at which they engage the central disc 17 at an equal radius to that of the outerdiscs 16 and 18 respectively, thus the gear as shown transmits a drive at a 1:1 ratio. The rollers 19, 20 are mounted in roller carriages 22 and control of the ratio angle is achieved by bodily moving the roller carriages 22 in substantially tangential directions with respect to the gear axis and by allowing the rollers then to steer themselves towards a different ratio angle. The rolled carriages are arranged so that a camber angle is furnished, that is to say an angle of inclination exists between the tilt axis of each roller carriage and a plane normal to the gear axis. This camber angle gives rise to a desirable mode of damping which can virtually eliminate any tendency for ratio angle oscillation and this facilitates the design of a highly stable gear without the need for elaborate additional damping devices for achieving the necessary damping. Furthermore, the degree of camber angle provided together with the maximum available tangential movement of each roller carriage will dictate the maximum degree of tilt (or ratio angle change) of the roller carriage.

The disc 18 is hollow and there is provided within the disc 18 a piston 23 which is secured to the output shaft 10. The piston 23 defines two axially spaced chambers 24 and 25 between opposed axial sides of the piston and the hollow disc 18. Pressurised fluid can thus be fed into the chamber 24 via passages 26 to effect axial movement of the disc 18 whilst fluid from a relatively low pressure source can be fed into the chamber 25. Thus, pressure of fluid in the chamber 25 induced by centrifugal force on rotation of the gear 11 will serve to balance or substantially balance fluid pressure in the chamber 24 similarly induced by centrifugal force.

To effect the aforesaid movement of the roller carriages 22 in substantially tangential directions with respect to the gear axis, a control system as shown in FIG. 2 is used. The control system comprises a valve assembly 27 and a governor 28. The valve assembly 27 is connected to one of the roller 22 as will be described and comprises a housing 29 having a hollow cylindrical cavity which extends from one end of the housing 29 and which terminates at its inner end in a reduced diameter portion, said hollow cylindrical cavity being arranged to define a cylinder 30 within which is disposed a first piston 31 and a second hollow piston in the form of a sleeve 32. This sleeve 32 is provided at its inner end with a radially outwardly extending flange 33 which slidably engages with that portion of the wall of the cylinder 30 which is not of reduced diameter. The piston 31 is arranged to extend through the sleeve 32 but to be in slidable engagement with the sleeve 32. The inner end of the piston 31 is arranged to slidably engage said reduced diameter portion of the cylinder 30. A bush 34 is provided within the cylinder 30 so as to surround the sleeve 32 adjacent the outer end thereof, and this bush 34 is maintained, in use, against a circlip 35 mounted in a groove formed in the inner wall of the cylinder 30 adjacent the open end thereof by means of a spring and/or hydraulic fluid in the manner which will become apparent hereinafter.

The housing 29 is provided with five ports 36, 37, 38, 39 and 40 wherein the ports 37 and 40 are interconnected by a supply pipe 41. The port 36 is, in use, connected to a source of pressurised hydraulic fluid in the form of a pump 42. The port 38 is, in use, connected to a further source of pressurised hydraulic fluid in the form of a pump 43 and this pump 43 also delivers hydraulic fluid to an input of the governor 28. The port 39 is, in use, connected to a supply pipe which is fed with control fluid from the governor 28. The ports 36 and 37 communicate with apertures 44 and 45 respectively formed in the bush 34. These apertures 44 and 45 communicate respectively with apertures 46 and 47 formed in the sleeve 32 and these latter apertures in turn communicate with an annular circumferential groove 48 formed in the piston 31 adjacent the outer end thereof. The outer end of the sleeve 32 is formed with an annular recess 49 which acts in association with a land 50 of the piston 31, said land being defined between the annular groove 48 and the outer axial end of the piston 31, to form means to reduce the pressure which, in use, is applied to the first piston 31 when the latter reaches a predetermined axial position relative to the sleeve 32.

The port 38 communicates with an annular chamber 51 defined between the inner axial end of the bush 34 and that axial end of the flange 33 adjacent the outer end of the sleeve 32. The port 39 communicates with a further annular chamber 52 defined between the innermost axial end of the flange 33, the wall of the cylinder 30 and the piston 31. Finally, the port 40 communicates with a chamber 53 defined between the wall of reduced diameter portion of the cylinder 30 and the inner axial end of the piston 31.

The governor 28 is mounted in the body of the drive gear and is conveniently driven by the load shaft 12 (shown in FIG. 1) to maintain the speed of the latter at a constant value. The governor is of a conventional form and includes pivoted weights 54 which are pivoted on pins 55 and which are rotatable bodily about the axis of the governor so that inwardly directed finger portions 56 on the weights bear upwards on a flange 57 of a piston valve 58, against the action of a spring 59, with a force which increases with increasing rotational speed owing to the centrifugal forces on the weights. When the speed of rotation of the load shaft 12 is at the desired value, a land portion 60 of the piston valve is centrally disposed with respect to a port 61 connected to the supply pipe which is connected to the port 39 formed in the housing 29. The pump 43 will, in use, supply hydraulic fluid as aforesaid to an input of the governor, that is to say a port 62 which communicates with an annular chamber 63 defined by the piston valve 58. When, in use, the load shaft is rotating at a speed below the desired value then the land portion 60 will be do disposed that the annular chamber 63 will communicate with the port 61 to thus permit fluid to go through the governor to the port 39 in the housing 29. The governor is also provided with a drain space 64 such that, in use, if the load shaft 12 attains a speed above the desired value then the land portion 60 will be moved upwardly from the position shown in FIG. 2 and hydraulic fluid within the supply pipe connected to the port 39 will be allowed to fall into the drain space 64 to thus reduce the pressure of hydraulic fluid in the chamber 52.

The outer axial end of the piston 31 is provided with a recess 65 arranged to receive a part spherical end portion 66 of one of the roller carriages 22, a further part spherical end portion 67 being associated with each roller carriage 22 and this part spherical end portion 67 is slidable within a guide cylinder 68. Movement of the piston 31 will thus effect a tilting movement of the roller carriage 22 associated therewith. The supply pipe interconnecting the ports 37 and 40 is connected to further supply pipes which supply hydraulic fluid to one axial end of further pistons (one of which is shown at 69 in FIG. 2) slidable in further cylinders (one of which is shown at 70 in FIG. 2) and to each of which is universally connected at one end, a further roller carriage 22. The hydraulic fluid to control the position of these roller carriages is taken as aforesaid from the supply pipe interconnecting the port 37 and the port 40 so that, as will become apparent hereinafter, the pressure influencing the movement of said further pistons associated with the other roller carriages will be equivalent to the pressure influencing the movement of the roller carriage associated with the piston 31.

In operation, the variable-ratio frictional drive gear may conveniently be used to drive an aircraft alternator wherein the input of the gear rotates at a variable speed. Thus, to run the alternator up from standstill pressurised hydraulic fluid is fed from the pump 32 to the port 36 from where it flows through the aperture 44 and the aperture 46 into the annular groove 48. Fluid supplied to the annular groove 48 will pass through the aperture 47 and the aperture 45 to the port 37 from where it will pass to the port 40 and thus into the chamber 53. Pressurised fluid fed to the chamber 53 will urge the piston 31 axially with respect to the sleeve 32 in a direction towards the associated roller carriage 22. However, it is to be appreciated that as the piston 31 moves axially with respect to the sleeve 32 than the land 50 will move to permit hydraulic fluid in the annular groove 48 to communicate with the recess 49 and since this is connected to drain the fluid pressure within the groove 48 and therefore in the chamber 53 will be reduced. Thus, the fluid pressure within the chamber 53 will cause the piston 31 to steer itself to an axial position with respect to the sleeve 32 such that the pressure within the chamber 53 is balanced by the reaction force on the rollers associated with the roller carriage connected to the piston 31. Hydraulic fluid supplied to the port 36 will also communicate with one axial end of the pistons associated with the other roller carriages and preferably this hydraulic fluid is also supplied to the passages 26 and the chamber 24 (FIG. 1) to thus provide an axial loading to the aforesaid torus discs.

Since the load shaft will be initially at stand-still and for some time after it will be rotating at a speed below the desired value, the land portion 60 of the piston valve 58 will therefore be displaced downwardly from the position shown in FIG. 2 such that the port 62 will increase its communication with the port 61 of the governor 28 via the annular chamber 63 so that pressurised hydraulic fluid is fed from the pump 43 to the port 39. The fluid supplied to the port 39 via the governor 28 will thus enter the annular chamber 52 and the fluid pressure within this chamber 52 will therefore increase to cause an axial loading on the flange 33 of the sleeve 32. The sleeve 32 will therefore move axially and as it moves in this manner it will tend to close any gap previously created between the land 50 and the internal wall of the sleeve 32 and this will cause the pressure within the chamber 53 to increase. This increase of pressure in the chamber 52 will lead to further tilting movement of the associated roller carriage 22. It will be noted that whilst the alternator is being run up to the required speed the governor will permit a high fluid pressure to be transferred to the chamber 52 and to prevent excessive movement of the roller carriages the bush 34 which will be maintained in engagement with the circlip 35 will limit the axial movement of the sleeve 32. When this limiting position is reached, any further movement of the piston 31 relative to the sleeve 32 in a direction towards the associated roller carriage 22 will cause the land 50 to move in such a way as to allow more fluid to escape from the annular groove 48 and thereby effect a reduction in pressure of the fluid in the chamber 53.

As the load shaft 12 and thus the alternator approaches the desired speed the piston valve 58 will move upwardly under the influence of the effect produced by centrifugal force on the governor weights 54 and the land portion 60 will gradually move to a position where it is centrally disposed with respect to the port 61. Thus the pressure of hydraulic fluid applied to the chamber 52 will reduce, thereby reducing the axial force applied to the flange 33 of the sleeve 32 and this sleeve 32 will therefore move in a direction away from the associated roller carriage 22, under the influence of the reactive force between the rollers and the torus discs. As the sleeve 32 moves away from its associated roller carriage 22 more fluid will be allowed to pass from the groove 48 to drain and this will cause a reduction of fluid pressure in the chamber 53 which will cause the piston 31 also to move in a direction away from its associated roller carriage. When the load shaft 12 and the alternator reach the required speed the piston 31 and the sleeve 32 will attain an equilibrium position and if as hereinbefore described the chamber 51 is supplied with hydraulic fluid from the pump 43 then the ratio of the fluid pressure within the chambers 51 and 52 will be the same or substantially the same as the ratio of the area of the innermost axial end of the flange 33 to the area of the other axial end of the flange 33. Thus, if the load conditions on the alternator change, thereby requiring different forces to be applied to the inner axial end of the piston 31, and when the piston 31 and the sleeve 32 have attained their equilibrium positions, the ratio of the fluid pressures within the chambers 51 and 52 will be constant or substantially constant for different loading conditions of the alternator. This will thus ensure that the piston valve 58 of the governor 28 will maintain the same or substantially the same position during all steady state conditions of the control system.

In an alternative embodiment, however, the annular chamber 51 may receive a spring or springs (not shown) which tend to urge the flange 33 away from the inner end of the bush 34. This spring (or springs) may or may not be additional to fluid pressure supplied to the chamber 51. When such spring (or springs) is present and when the alternator has been run up to its normal operating speed, changes in load on the alternator will only necessitate slight movements of the sleeve 33 to compensate for this change of load and therefore the piston valve 58 of the governor 28 will maintain substantially the same position during all steady state conditions of the control system.

Returning to the first embodiment, if, in use, the loading on the alternator does increase, then the reactive force between the rollers and the torus discs will tend to urge the piston 31 in a direction away from its associated roller carriage and the land 50 will thus tend to close any gap between the groove 48 and the recess 39. This will lead to an increase of fluid pressure within the annular groove 48 and therefore in the chamber 53 and this will cause the necessary force to be applied to the inner axial end of the piston 31 to balance this additional reactive force and then thereby maintain the speed of the alternator at the desired speed. The decrease in the load on the alternator will have the opposite effect by virtue of the land 50 moving away from the inner end of the cylinder 30.

It will be appreciated, that since movement of the piston 31 is controlled by the fluid pressure within the chamber 53 and since it is this fluid pressure which communicates with said one axial end of each of the pistons 69 associated with the other roller carriages 22, then these other roller carriages will be subjected to the same force as the roller carriage associated with the piston 31. Furthermore, it will be noted that the control fluid, that is to say the fluid supplied to the chamber 52, is independent of the hydraulic fluid which influences the slidable movement of the piston 31 in the sleeve 32.

Moreover, by virtue of the fact, as aforesaid, that the same hydraulic fluid is fed to the chamber 24 as is supplied to control the position of the rollers, the axial loading force by which the torus discs are urged together will always be proportional to the force applied to the rollers. Thus the axial loading is automatically maintained substantially at an appropriate value which is at all times neither too low nor unnecessarily high for permitting the rollers to achieve the required frictional transmission.

It is preferable that a pressure relief valve is incorporated somewhere within each of the hydraulic fluid supplies from the pumps 42 and 43 to thereby cater for any fault conditions which may occur within the control system.

It is also to be understood that the control system as described hereinbefore may be modified to cater for the gear operating in the opposite sense, that is to say, instead of the reactive force between the rollers and the torus discs tending to urge the piston 31 in a direction away from its associated roller carriage, the reactive force between the rollers and the torus discs may be arranged to pull the piston 31 in a direction towards its associated roller carriage.

We claim:

1. A variable ratio frictional drive gear comprising two axially spaced torus discs having respective mutually presented toroidal surfaces, a set of circumferentially spaced drive rollers in frictional contact with the toroidal surfaces of the discs, roller carriages in which the rollers are respectively rotatably mounted about axes at right angles to the roller axes, to vary the distance from an axis of the drive gear at which the rollers engage the discs, a first piston arranged, under the influence of hydraulic fluid supplied thereto, to control tilting movement of at least one of the roller carriages, a second hollow piston in which the first piston is slidable, pressure reducing means operable when said first piston reaches a predetermined position in relation to said second piston, a cylinder in which the second piston is slidable, a governor for supplying fluid to said cylinder, and means independent of the hydraulic fluid supplied to said first piston, for supplying control fluid to said governor and thence to said cylinder.

2. A variable ratio frictional drive gear as claimed in claim 1 wherein said second hollow piston is in the form of a sleeve, a radially outwardly extending flange at the inner end of said sleeve being slidably engaged the wall of said cylinder.

3. A variable ratio frictional drive gear as claimed in claim 1 wherein an annular passageway defined by an annular circumferential groove in the first piston and said second piston provides a source of hydraulic fluid, said passageway being connected to one axial end of said first piston, said pressure reducing means comprising a recess formed in said second piston communicating with said annular circumferential groove when said first piston reaches said predetermined axial position in relation to said second piston to allow hydraulic fluid to escape from said annular passageway.

4. A variable ratio frictional drive gear as claimed in claim 2 wherein a pair of chambers are defined between opposed ends of said radially outwardly extending flange and said housing and one of said chambers which is partly defined by the innermost axial end of the flange is arranged to be supplied with control fluid from the governor and the other of said chambers is arranged to be supplied with hydraulic fluid to urge the second piston against force exerted by said control fluid.

5. A variable ratio frictional drive gear as claimed in claim 1 wherein said first piston is connected to one of said roller carriages.

* * * * *